United States Patent [19]

Monforte

[11] Patent Number: 4,723,353
[45] Date of Patent: Feb. 9, 1988

[54] EXCHANGEABLE MULTI-FUNCTION END EFFECTOR TOOLS

[76] Inventor: Mathew L. Monforte, 12 Ashwood Rd., Hamilton, N.J. 08610

[21] Appl. No.: 884,207

[22] Filed: Jul. 10, 1986

Related U.S. Application Data

[62] Division of Ser. No. 610,032, May 14, 1984, Pat. No. 4,627,785.

[51] Int. Cl.$^4$ .................. B23Q 3/155; B25J 15/04
[52] U.S. Cl. ...................... 29/568; 414/737; 901/30; 901/39
[58] Field of Search .............. 29/568; 414/737; 901/30, 31, 39–41

[56] References Cited

U.S. PATENT DOCUMENTS 4,591,198 5/1986 Monforte .................. 901/39 X
4,611,846 9/1986 Feiber et al. ............. 901/40 X
4,627,785 12/1986 Monforte ................. 901/31 X Primary Examiner—Gil Weidenfeld
Assistant Examiner—Steven C. Bishop
Attorney, Agent, or Firm—Sachs & Sachs

[57] ABSTRACT

An exchangeable multiple function end effector tool suitable for use on the distal end of a robotic end effector includes, in combination; a mechanism for removably affixing the multiple function end effector tool onto a pair of extending fingers provided on a robotic end effector. The multiple function tool is provided with a first gripping device for acquiring a first element or component and releasably retaining it and further incorporates a second gripping device which is capable of acquiring a second element or component and releasably retaining it in the tool. Provision is made for engaging and disengaging the elements either separately or in unison. Movement, assembly or disassembly of the elements remains a function of the end effector and its control mechanisms.

11 Claims, 5 Drawing Figures

EXCHANGEABLE MULTI-FUNCTION END EFFECTOR TOOLS

The present application is a Division of prior application Ser. No. 610,032, filed May 14, 1984 which is now U.S. Pat. No. 4,627,785.

BACKGROUND OF THE INVENTION

1. Field of the Invention

The present invention relates to end effector tools, and more particularly, relates to an exchangeable multi-functional tool suitable for use on a robotic end effector disposed on the distal end of a robotic arm.

2. Discussion of the Relevant Art

Automated production lines in use today incorporate automatic machinery and automatic control arms to perform numerous functions. Generally these robotic control arms perform one particular function. With improvements in the state of the art intelligent robots are capable of changing their tools while using end effector mechanisms disposed on the distal end of the robotic arm. These end effector mechanisms are capable of retrieving and/or exchanging several of these tools so that the arm is capable of more than one function and may be readily programmed to accomplish any number of functions leading to a finished product. Generally, however, the tools themselves are capable of performing one type of function such as, grasping an outer diameter, grasping in inner diameter, inserting a screw, applying paint, welding, etc.

Automatic production lines utilizing robots with arms capable of changing tools affixed to the distal end thereof include what is generally referred to as an "end effector". A typical production line is disclosed in U.S. patent application Ser. No. 577,570 filed on Feb. 6, 1984, now abandoned. An end effector affixed on the robotic arm used on this type of robot is disclosed in detail in U.S. Pat. No. 4,591,198, issued to Mathew L. Monforte, on May 27, 1986 and is included herein in its entirety. A typical end effector tool capable of a single function which may be utilized on the end effector mentioned above is disclosed in detail in U.S. patent application Ser. No. 830,677 filed on Feb. 19, 1986, now abandoned.

The exchangeable multi-function end effector tool described herein is a further improvement over the known state of the art, since it provides a tool suitable for use with a robotic end effecular that is capable of performing multiple functions as will be described in detail hereinafter.

Therefore, it is an object of the present invention to provide an exchangeable multi-function end effector tool that is capable of being received on the extending fingers of an end effector.

It is another object of the present invention to provide a multiple function end effector tool which may be readily captured and released by a locking mechanism disposed on the fingers of an end effector disposed on the distal end of a robotic arm.

It is yet another object of the present invention to provide a multi-functioned end effector tool which when captured by the end effector locking mechanism maintains the mechanical integrity of the system.

It is still yet another object of the present invention to provide a multi-functioned end effector tool that may be readily modified to perform alternative multiple functions.

It is yet another object of the present invention to provide a multi-functioned end effector tool that is readily captured by a computer controlled locking mechanism disposed on the extending fingers of a robotic end effector while maintaining the mechanical integrity and accuracy of the system.

It is still another object of the present invention to provide a multi-functioned end effector tool capable of providing automatic sensing to indicate when the tool has captured an element or component and has placed it in the proper position.

SUMMARY OF THE INVENTION

An exchangeable multiple-function end effector tool suitable for use with a robotic end effector having a pair of extending fingers, including indexing means and computer controlled locking means and disposed on the distal end of a robotic arm, according to principles of the present invention, comprises in combination; an arrangement for removably affixing and locking the multiple-function end effector tool on the extending fingers of the robotic end effector. The tool device has the affixing arrangement disposed thereon which includes first and second gripping mechanisms for acquiring first and second elements and releasably retaining same, provision being made for engaging and disengaging the elements separately or together.

The foregoing and other objects and advantages will appear from the description to follow. In the description reference is made to the accompanying drawing which forms a part hereof, and in which is shown by way of illustration, specific embodiments in which the invention may be practiced. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWING

The subject matter which I regard as my invention is particularly pointed out and distinctly claimed in the concluding portion of this specification. The invention, however, both to organization and method of operation, together with further objects and advantages thereof may best be understood by reference to the following description taken in connection with the accompanying drawing, wherein like reference characters refer to like elements and in which:

DESCRIPTION OF THE PREFERRED EMBODIMENTS

Figure 1:
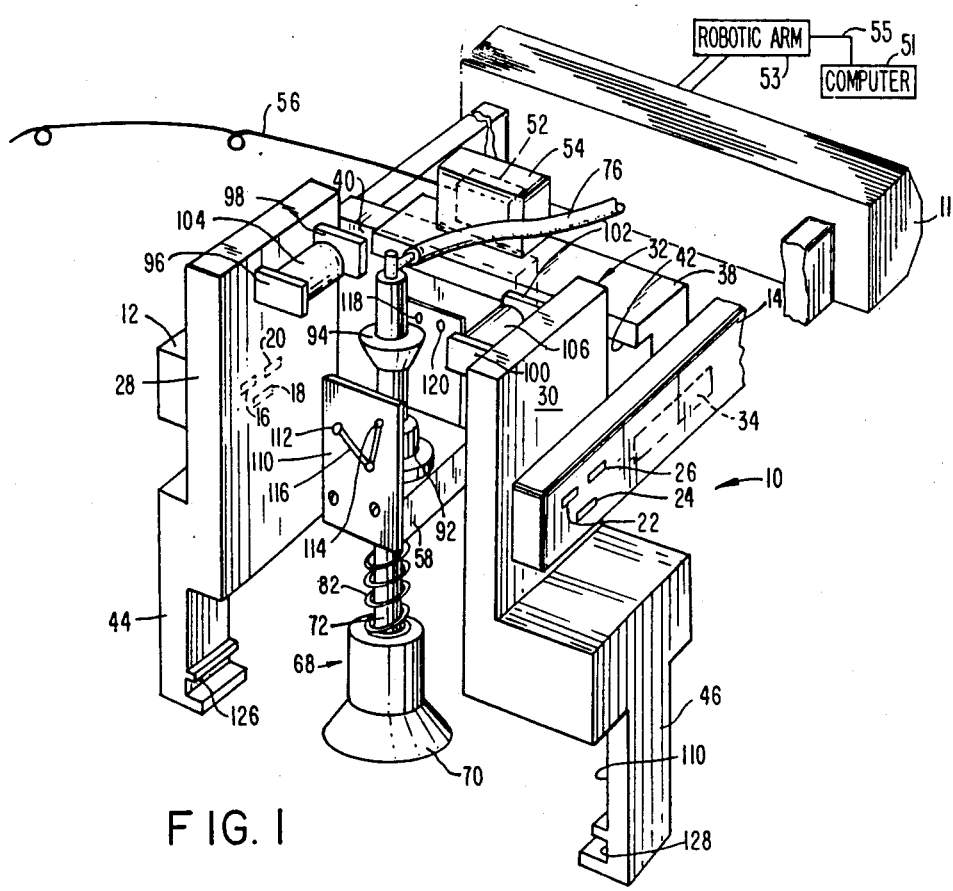
FIG. 1 is a perspective view, not to scale, of a multi-functional end effector tool affixed to an en effector disposed on the distal end of a robotic arm, which is computer controlled, according to the principles of the present invention.
Figure 2:
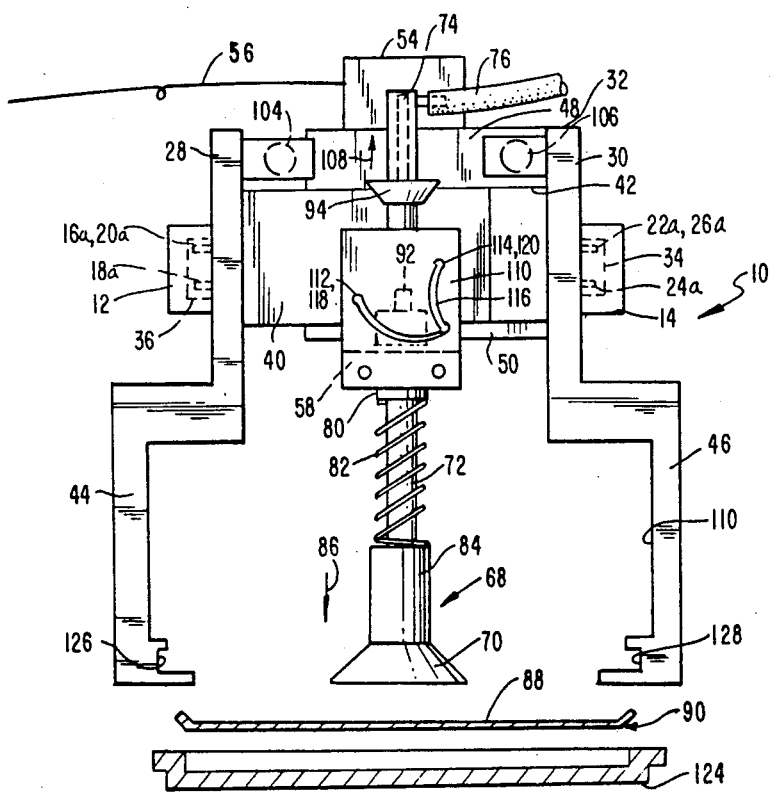
FIG. 2 is a front elevational view of the multi-functional end effector tool shown in FIG. 1.

Referring now to the figures, and in particular to FIGS. 1 and 2, which shows a multiple-function end effector tool 10, according to the principles of the present invention. The end effector tool is shown affixed to the extending fingers 12 and 14 emanating from an end effector 11 of the type disclosed in the U.S. Pat. No. 4,591,198 issued to M. L. Monforte. The end effector fingers 12 and 14 are provided with an indexing arrangement in the form of apertures 16, 18, and 20 disposed in finger 12 and apertures 22, 24 and 26 disposed in finger 14, preferably elongated and adapted to receive mating elongated members 16a, 18a, and 20a provided in the generally vertically disposed portions 28 and 30 of the frame 32 of the multiple-function end effector tool 10. The extending fingers 12 and 14 are hollow members having disposed therein locking mechanisms 34 and 36 disposed internally in extending fingers 14 and 12, respectively. The details of the indexing and locking mechanisms are described in the U.S. Pat. No. 4,591,198 to M. L. Monforte mentioned earlier.

The rear portion 38 of the frame 32 is fabricated of a conventional tongue and groove or cooperating U-channel arrangement wherein the tongue portion 40 is affixed to the vertical portion 28 of frame 32 and is permitted to freely slide within the groove or channel 42 provided in the vertical portion 28 of the frame 32. The tongue and groove portions preferably are disposed in a horizontal plane, capable of free movement therebetween, thus permitting the vertical portions 28 and 30 to move in a horizontal plane permitting the lower portions 44 and 46 extending from portions 28 and 30, respectively, to move in a horizontal direction towards and away from each other; the reasons therefor will become apparent shortly. Thus, movement of the fingers 12 and 14 of the end effector 11 will permit the lower portions 44 and 46 to engage and disengage an object, element or component, which will be explained hereinafter.

The groove or channel 42 is provided with an upper lip portion 48 and a lower lip portion 50. The electronic circuitry 52, integrated or otherwise, is contained in a housing 54 which is affixed to the upper lip portion 48 in a conventional manner. The electronic circuitry is coupled to the main control computer 51 and robot arm 53, via cable harnesses 55 and 56 connected thereto.

Figure 3:
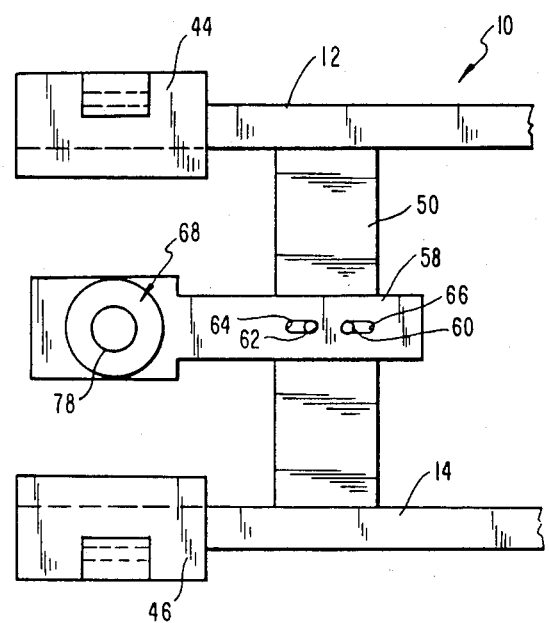
FIG. 3 is a bottom view of the multi-function end effector tool disclosed in FIGS. 1 and 2.

A shelf portion 58 (see FIG. 3) has one end thereof affixed to lower lip portion 50 by means of a pair of screws 60 and 62 being inserted through cooperating apertures 64 and 66 respectively, adapted to cooperate therewith. Apertures 64 and 66 are preferably slightly elongated to allow for the alignment of the spring loaded suction cup 68 which extends therethrough as will be explained hereinafter.

The suction cup 68 includes a suction portion 70 disposed on one end of a hollow rod 72. The suction portion may be fabricated of a resilient material, such as rubber or any other plastic material. The rod includes a central aperture 74 which extends completely therethrough having one end thereof terminating at the suction portion 70 and the other end having a nipple thereon suitable for connection, via a flexible hose 76, to a vacuum system, not shown through a control valve activated by the main computer system, not shown. An aperture provided in the shelf portion 58 is provided with an Oilite bearing 78, that permits relatively friction free movement of the rod 72 through the aperture 78 while maintaining the alignment thereof. A spring member 82 circumscribes the rod 72 and is disposed between a collar 84 used to hold the suction portion 70 onto rod 72 and the bearing 80, thus urging the suction portion 70 of the spring loaded vacuum suction cup 68 away from the shelf portion 58 in the direction of arrow 86. The suction portion 70 extends beyond the lower portions 44 and 46 so that it may readily engage a flat surface 88 provided on a disk member 90. The upper portion of hollow rod 72 is provided with a second collar 92 which serves two functions; one being to limit the travel of the rod 72 in the direction of arrow 86 and the second, as will be explained later, will indicate the position of the spring loaded vacuum suction cup 68. Proximate the upper distal end of rod 72, a tapered collar 94 is affixed in a conventional manner. Hereagain, the function thereof will be explained hereinafter.

The inner surface of vertical portions 28 and 30 are provided with inwardly extending members 96, 98, 100 and 102, respectively, which have mounted therebetween roller bearings 104 and 106, respectively. Inwardly extending members 96, 98, 100 and 102 are disposed on vertical portions 28 and 30 directly in line with each other and the roller bearings 104 and 106 are positioned to come into contact with the sloped surface of collar 94. Thus when roller bearings 104 and 106 are urged into contact with collar 94 they will cause collar 94 to rise in an upwardly direction (in the direction of arrow 108) moving rod 72 in an upwardly direction raising the suction portion 70 upwardly into the open portion 110 of the end effector tool 10. The most inwardly extending edges of members 96, 98, 100 and 102 function as limit stops and prevent the extending fingers 12 and 14 from closing the multiple-function end effector tool 10 beyond the predetermined limits.

A circuit board 110 is disposed on the forward edge of shelf portion 58 and has mounted thereon a pair of light emitting diodes (LED's) 112 and 114 which are connected, via wires 116, to the housing for the electronic circuitry 54. A pair of photoelectric detectors 118 and 120 are mounted on a printed circuit board 122 disposed on shelf portion 58 on the other side of the collars 94 and 92 with the light beams emanating from diodes 112 and 114 impinging directly upon the cooperating detectors 118 and 120, so that when collar member 92 is raised to the first level the light emitted from LED 112 will be blocked thereby, and when the collar reaches the second level the light emitted from LED 114 will be blocked thereby, thus breaking the light path from light emitting diodes 112 and 114 to photoelectric detectors 118 and 120, respectively. Thus, the interruption of the light paths will provide a signal to the main computer, not shown, indicating when the suction portion 70 has reached the proper level permitting further closing of the fingers 12 and 14 so that the lower portions 44 and 46 may readily engage a second component or member 124 within the channels 126 and 128 provided in lower portions 44 and 46, respectively.

Figure 5:
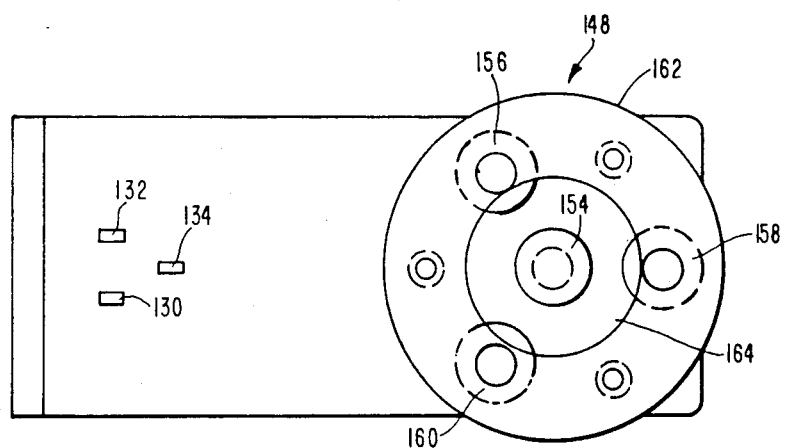
FIG. 5 is a bottom view of the multi-functional end effector tool shown in FIG. 4.
Figure 4:
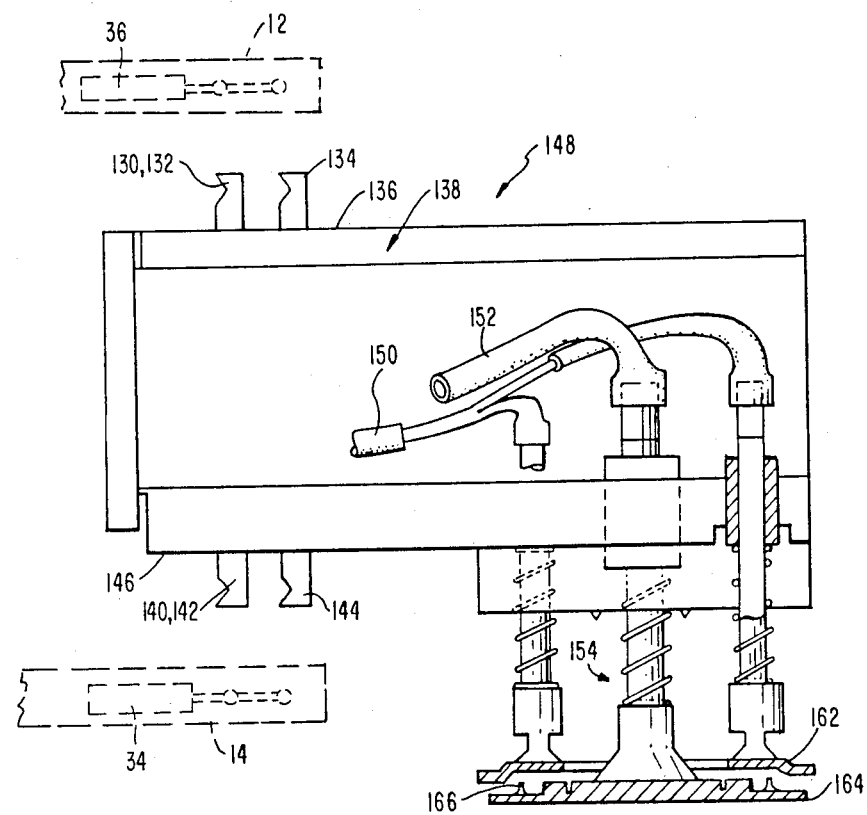
FIG. 4 is a side view, in elevation, of an alternative embodiment of a multi-functional end effector tool.

Referring now to FIGS. 4 and 5, which disclose an alternative embodiment of the instant invention. The extending fingers 12 and 13 of the robotic end effector 11 may engage the extending protrusions 130, 132, and 134 provided on the top 136 of housing 138 and protrusions 140, 142 and 144 provided on the bottom 146 of housing 138 thereby enabling the multi-function end effector tool 148 to move to a desired location. In this embodiment a dual vacuum system is incorporated. The inner and outer vacuum systems are separately controlled by the computer 51 and the control valves, not shown, which are coupled, via flexible hoses 150 and 152, to the spring loaded vacuum suction cup 154 which is disposed in the center and suction cups 156, 158 and 160 which are equally spaced and disposed about the periphery of an imaginary circle so they may readily pick up a generally flat disk-shaped member 162 having its center removed. The centrally disposed suction cup 154 may readily engage a component 164, which has a generally flat surface and a central portion accessible to the centrally disposed suction cup 154.

Suction cup members 156, 158 and 160 are similar in construction to the spring loaded vacuum suction cup 68 described in the earlier embodiment and may be utilized to engage component 162 from a holding fixture by moving the robotic end effector 11 into position. Once the vacuum has been activated in flexible hose line 150 component 162 will be affixed to suction cups 156, 158 and 160 and movement of the robotic end effector towards component 164 may be readily accomplished.

For example, the embodiment shown in FIGS. 4 and 5 may operate by having component 164 placed in a holding fixture with a solder ring 166 disposed proximate the circumference thereof. The central suction cup 154 may be provided with a generally longer throw position so that its construction, although being similar to the spring loaded vacuum suction cup 68 described in conjunction with the prior embodiment, may be adjusted to permit extension beyond the edges of suction cups 156, 158 and 160, thereby enabling it to engage component 164 in the center thereof. Once the vacuum has been created, component 164 will adhere to the suction cup 154.

Once components 162 and 164 have been affixed to the multi-function tool, which may be moved to a washing operation or flux bath and then pressed against the flat surface wherein components 162 and 164 come into contact with each other with the soldering sandwiched therebetween. Thus, the assembly may now be subjected to a heating operation, such as ultra-sonic welding, where the solder causes the components to be soldered together. Releasing of the vacuum permits the new assembly to be removed from the multi-function tool 148. Those knowledgeable in the art may utilize this type of multi-function device to perform a variety of different functions.

The first embodiment, in operation, utilizes the same capturing method for obtaining a component 90 and by movement of the end effector fingers 12 and 14 causes the object 90 to rise within the fixture, thus permitting the lower portions 44 and 46 of the multi-function tool to engage a second component 124 within the channels 126 and 128 provided in lower portions 44 and 46, respectively. With this type of multi-function tool the components may be subjected to another operation such as cleansing, and be released simultaneously or individually since component 124 may readily be released by moving fingers 12 and 14 in an outwardly direction, while component 90 may be retained by the spring loaded vacuum suction cup 68 as long as the vacuum remains intact. The vacuum being intact, after contacting a component, clearly indicates the acquisition of a component and this provides a signal to the central computer 51, in a conventional manner, after a prescribed period of time.

Hereinbefore has been disclosed a multiple-function end effector tool suitable for use with robotic end effectors. The utilization of multi-function tools is limitless and the imagination of those knowledgeable in the art can envision an infinite number of variations in these basic components. Therefore, it will be understood that various changes in the details, materials, arrangement of parts and operating conditions which have been hereinbefore described and illustrated in order to explain the nature of the invention may be made by those skilled in the art within the principles and scope of the present invention.

Having thus set forth the nature of the invention, what is claimed is:

1. An exchangeable multi-function end effector tool suitable for use with a robotic end effector having a pair of extending fingers, including indexing means and computer controlled locking means, disposed on the distal end of a robotic arm, comprising in combination:
   (A) means for removably affixing said multiple function end effector tool to said pair of extending fingers including,
      (a) engaging means, said engaging means being accessible to said end effector extending fingers and having,
         (i) tool indexing means for mating and cooperating with said end effector indexing means provided on said end effector extending fingers, and
         (ii) a locking device for cooperating with said computer controlled end effector finger locking means to retain said tool upon said end effector extending fingers; and
   (B) multiple function tool means having said tool affixing means disposed thereon, said multiple function tool means including,
      (i) first gripping means for acquiring a first element and releasably retaining said first element in said multiple function tool, and
      (ii) second gripping means for acquiring a second element and releasably retaining said second element in said multiple function tool.

2. An exchangeable multiple function end effector tool according to claim 1 wherein said tool indexing means comprises:
   (a) an arrangement that permits only one position for positive engagement with a mating arrangement provided on said end effector fingers, including;
      (i) alignment means for maintaining the dimensional integrity of said robotic arm when engaged in said end effector fingers; and
      (ii) receiving means for receiving said locking device disposed in said end effector fingers and for removably affixing said tool upon said end effector fingers.

3. An exchangeable multi-function end effector tool according to claim 1, wherein said tool engaging means includes an extending portion containing said tool indexing means for permitting engagement of said end effector indexing means disposed on said end effector fingers when said fingers are moving in a closing direction.

4. An exchangeable multi-function end effector tool according to claim 1 wherein said first gripping means includes a vacuum suction device for grasping and retaining a generally flat surface.

5. An exchangeable multi-function end effector tool according to claim 1, wherein said second gripping means includes means for grasping the outer periphery of an element.

6. An exchangeable multi-function end effector tool suitable for use with a robotic end effector having a pair of extending fingers, including indexing means and computer controlled locking means, disposed on the distal end of a robotic arm, comprising in combination:
(A) means for removably affixing said multiple function end effector tool to said pair of extending fingers including;
  (a) engaging means, said engaging means being accessible to said end effector extending fingers and having,
    (i) tool indexing means for mating and cooperating with said end effector indexing means provided on said end effector extending fingers, and
    (ii) a locking device for cooperating with said computer controlled end effector finger locking means to retain said tool upon said end effector extending fingers; and
(B) multiple function tool means having said tool affixing means disposed thereon, said multiple function tool means including;
  (i) first gripping means for acquiring a first element and releasably retaining said first element in said multiple function tool, said first gripping means having;
    (a) spring means for urging said first gripping means to its lowermost position;
    (b) collar means disposed on said gripping means for limiting the travel of said first gripping means between its lowermost and uppermost positions; and
    (c) sensing means disposed proximate said first gripping means for providing an electrical signal when said first gripping means is in its uppermost and lowermost position,
  (ii) second gripping means for acquiring a second element and releasably retaining said second element in said multiple function tool.

7. An exchangeable multi-function end effector tool according to claim 1, further including sensing means for indicating when said tool means has engaged an element.

8. An exchangeable multi-function end effector tool according to claim 7 wherein said sensing means is a photoelectric sensor, said sensor providing an electrical signal when said collar means interrupts the light beam impinging upon said photoelectric sensor.

9. An exchangeable multi-function end effector tool according to claim 1 wherein said means for engaging and disengaging said first and second element is further capable of disengaging said first and second elements separately or together once they are mated.

10. An exchangeable multi-function end effector tool according to claim 1, wherein said first and said second gripping means includes a vacuum suction device for grasping and releasably retaining generally flat surfaces.

11. An exchangeable multi-function end effector tool according to claim 7 wherein said sensing means is a photoelectric sensing means.

* * * * *